United States Patent
Huang et al.

(10) Patent No.: US 10,856,169 B2
(45) Date of Patent: Dec. 1, 2020

(54) BEAM MEASUREMENT AND REPORTING IN CELLULAR NETWORKS

(71) Applicant: Apple Inc., Cupertino, CA (US)

(72) Inventors: Rui Huang, Beijing (CN); Yang Tang, Santa Clara, CA (US); Candy Yiu, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/324,667

(22) PCT Filed: Jun. 29, 2017

(86) PCT No.: PCT/US2017/039892
§ 371 (c)(1),
(2) Date: Feb. 11, 2019

(87) PCT Pub. No.: WO2018/031138
PCT Pub. Date: Feb. 15, 2018

(65) Prior Publication Data
US 2019/0182696 A1    Jun. 13, 2019

Related U.S. Application Data

(60) Provisional application No. 62/373,742, filed on Aug. 11, 2016.

(51) Int. Cl.
*H04W 24/10* (2009.01)
*H04W 16/28* (2009.01)
*H04W 72/12* (2009.01)

(52) U.S. Cl.
CPC ............ *H04W 24/10* (2013.01); *H04W 16/28* (2013.01); *H04W 72/12* (2013.01)

(58) Field of Classification Search
CPC .................................................. H04W 24/10
See application file for complete search history.

(56) References Cited

U.S. PATENT DOCUMENTS

2012/0252487 A1* 10/2012 Siomina ................ G01S 5/0205
                                                    455/456.1
2016/0337916 A1* 11/2016 Deenoo ............. H04W 36/0094
(Continued)

FOREIGN PATENT DOCUMENTS

WO        2016044991 A1      3/2016

OTHER PUBLICATIONS

Samsung; "Discussion on Beam Measurement and Tracking for 5G New Radio Interface in mmWave Frequency Bands"; R2-162226; 3GPP TSG RAN WG2 #93bis Dubrovnik, Croatia, Apr. 11 to 15, 2016 (Year: 2016).*

(Continued)

*Primary Examiner* — Gary Mui
(74) *Attorney, Agent, or Firm* — Stoel Rives LLP

(57) ABSTRACT

New radio (NR), also known as fifth generation (5G) radio or fifth generation long term evolution (5G LTE)) uses a measurement gap that allows for measurement on different beams, multiple frame structure and inter-radio access technology measurement. For example, in measurement on the different beams, the UE (114) and eNB (304) beam sweep (i.e., change analog beam transmitter). The UE (114) can measure different beams from a fifth generation node B (gNB) and/or other RAN nodes. The measurement gap can be used for intrafrequency/interfrequency measurement when beam specific reference signals (BRSs) are not transmitted in the same subframe. A multiple frame structure can use the specific measurement configuration to utilize the beam resources efficiently. LTE and NR and other interRAT measurement can also use the measurement gap.

20 Claims, 9 Drawing Sheets

(56) References Cited

U.S. PATENT DOCUMENTS

| | | | |
|---|---|---|---|
| 2017/0195033 A1 | 7/2017 | Zhang et al. | |
| 2017/0207845 A1* | 7/2017 | Moon | H04B 7/088 |
| 2017/0208494 A1* | 7/2017 | Moon | H04B 7/065 |
| 2017/0325244 A1* | 11/2017 | Zhang | H04L 5/0048 |
| 2017/0373740 A1* | 12/2017 | Guo | H04L 5/006 |
| 2018/0007577 A1* | 1/2018 | Guo | H04W 36/30 |
| 2019/0123870 A1* | 4/2019 | Frenne | H04B 7/0617 |
| 2019/0159054 A1* | 5/2019 | Yiu | H04B 17/318 |

OTHER PUBLICATIONS

Intel Corporation, "Beam Support in NB", R2-162709, 3GPP TSG RAN WG2 Meeting #93bis, Dubrovnik, Croatia, Agenda Item 9.5.3, Apr. 11-15, 2016, 4 pages.

PCT/US2017/039892, International Search Report and Written Opinion, dated Sep. 28, 2017, 19 pages.

Samsung, "Discussion on Beam Measurement for 5G New Radio Interface in mmWave Frequency Bands", R2-163652, 3GPP TSG RAN WG2 #94, Nanjing, China, Agenda Item 9.51, May 23-27, 2016, 4 pages.

\* cited by examiner

US 10,856,169 B2

BEAM MEASUREMENT AND REPORTING IN CELLULAR NETWORKS

RELATED APPLICATION

This application is a national stage filing under 35 U.S.C. § 371 of International Patent Application No. PCT/US2017/039892, filed Jun. 29, 2017, which claims the benefit under 35 U.S.C. § 119(e) of U.S. Provisional Application No. 62/373,742 filed Aug. 11, 2016, each of which is incorporated by reference herein in its entirety.

TECHNICAL FIELD

The present disclosure relates to cellular networks and more specifically to beam measurement in cellular systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node.

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN 104 implements GSM and/or EDGE RAT, the UTRAN 106 implements universal mobile telecommunication system (UMTS) RAT or other 3GPP RAT, and the E-UTRAN 108 implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable new radio (NR, also known as fifth generation (5G) radio or fifth generation long term evolution (5G LTE)) to use a measurement gap that allows for measurement on different beams, multiple frame structure and inter-radio access technology measurement. For example, in measurement on the different beams, the UE and eNB are expected to beam sweep (i.e., changing analog beam transmitter). Thus UEs can to measure the different beams from eNB at least. The measurement gap may be required for intrafrequency/interfrequency measurement when beam specific reference signals (BRSs) are not transmitted in the same subframe. A multiple frame structure can use the specific measurement configuration to utilize the resource efficiently. LTE and NR and other interRAT measurement can also use the measurement gap. An eNB can avoid (or prevent) scheduling of the UE during the beam sweep to allow the UE to perform the measurements. This avoiding scheduling of a UE during a gap (or gaps) of the beam measurement pattern can be referred to as avoiding scheduling the UE during the beam measurement pattern or preventing scheduling the UE during the beam measurement pattern.

In NR, extending the mobility communication to the high frequency carriers (such as carriers with frequencies greater than 6 GHz) with the basic coverage, a multibeam approach is one of the promising solutions. Measurements on the transmission (Tx) and reception (Rx) beams are used to enable handover, beam selection and/or switching operations. The beam specific reference signal (BRS) can be used for NR beam selection/switching operations. Long term evolution (LTE) cell specific reference signals (CRSs) are used in long term evolution (LTE) for the mobility measurements (e.g., handover and cell selection/reselection). BRS can be used for the legacy cell specific mobility management and also the beam access.

Figure 1:
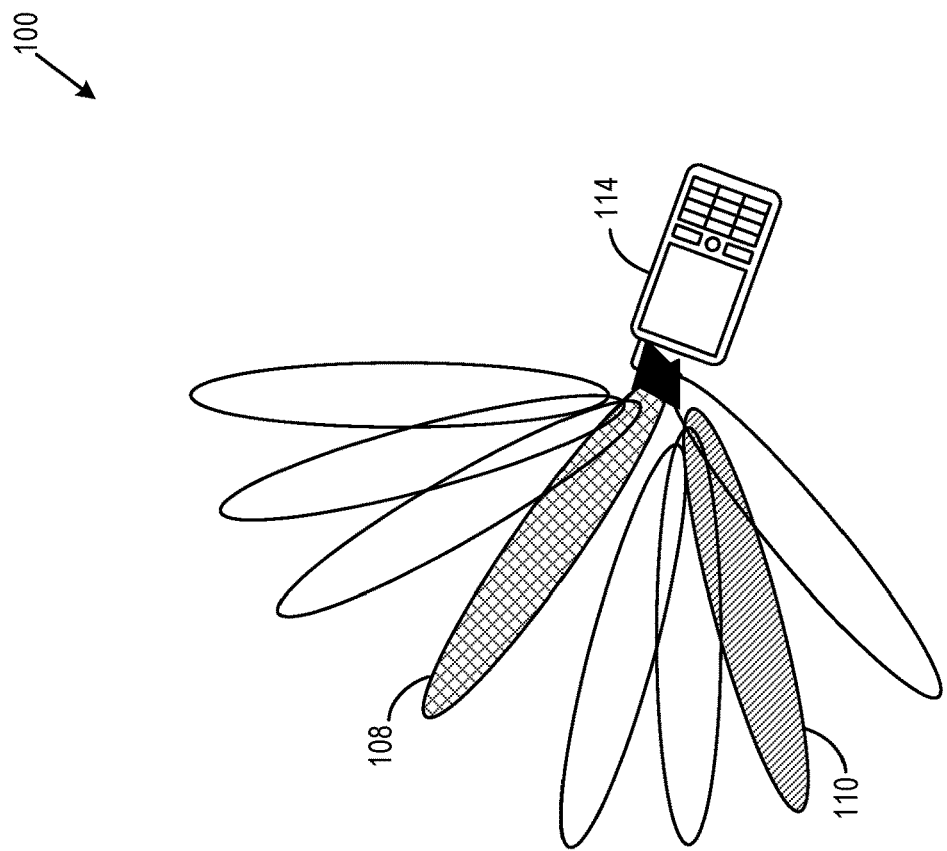
FIG. 1 is a schematic diagram illustrating a transmission reception point (TRP or sometimes referred to as a TRxP) performing beam sweep measurements with a user equipment (UE) consistent with embodiments disclosed herein.
Figure 1:
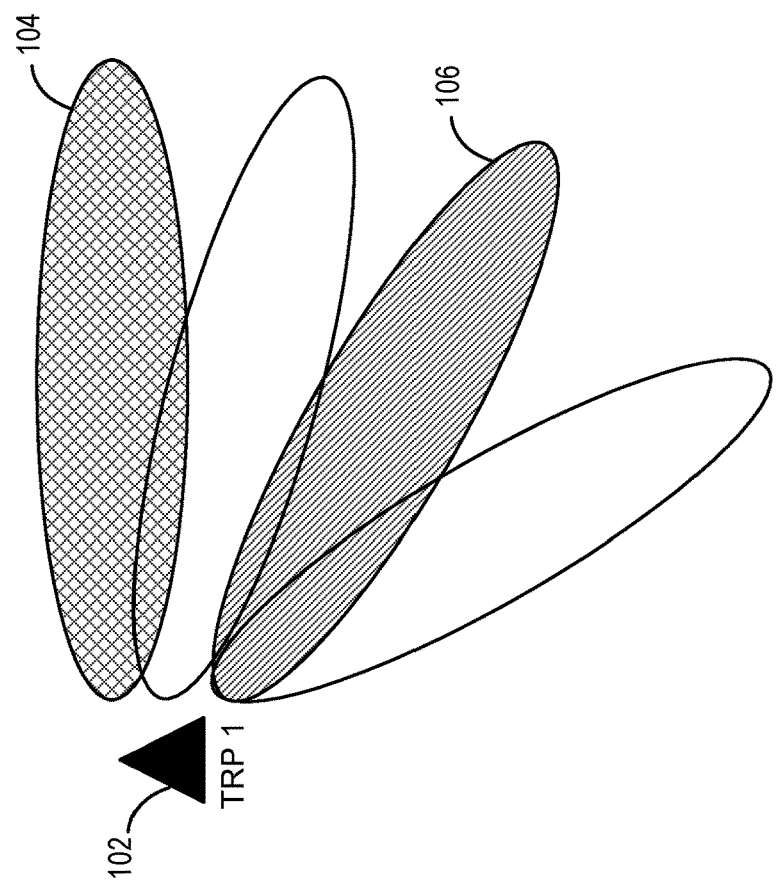

FIG. 1 shows radio access network (RAN) 100 with a transmission reception point (TRP 102 or sometimes referred to as a TRxP) 102 performing beam sweep measurements with a user equipment (UE) 114. During a beam sweep, matching downlink (DL) beams 104 and 106 and matching uplink (UL) beams 108 and 110 can be determined. DL beams can include a Tx beam 104 from the TRP 102 (e.g., a fifth generation node B (gNB or 5G eNB) and an Rx beam 108 from the UE 114. UL beams can include a Tx beam 110 from the UE 114 and an Rx beam 106 from the gNB 102.

In NR, a new measurement gap can allow for measurement on different beams, multiple frame structure and interradio access technology measurement. In measurement on the different beams, the UE and eNB beam sweep. For example, the UE can measure different beams from a gNB. The measurement gap can also be used for intrafrequency/interfrequency measurement when beam RS are not transmitted in the same subframe. Multiple frame structure can use the specific measurement configuration to utilize the resource efficiently. LTE and NR and other interRAT measurement can also use the measurement gap.

Figure 2:
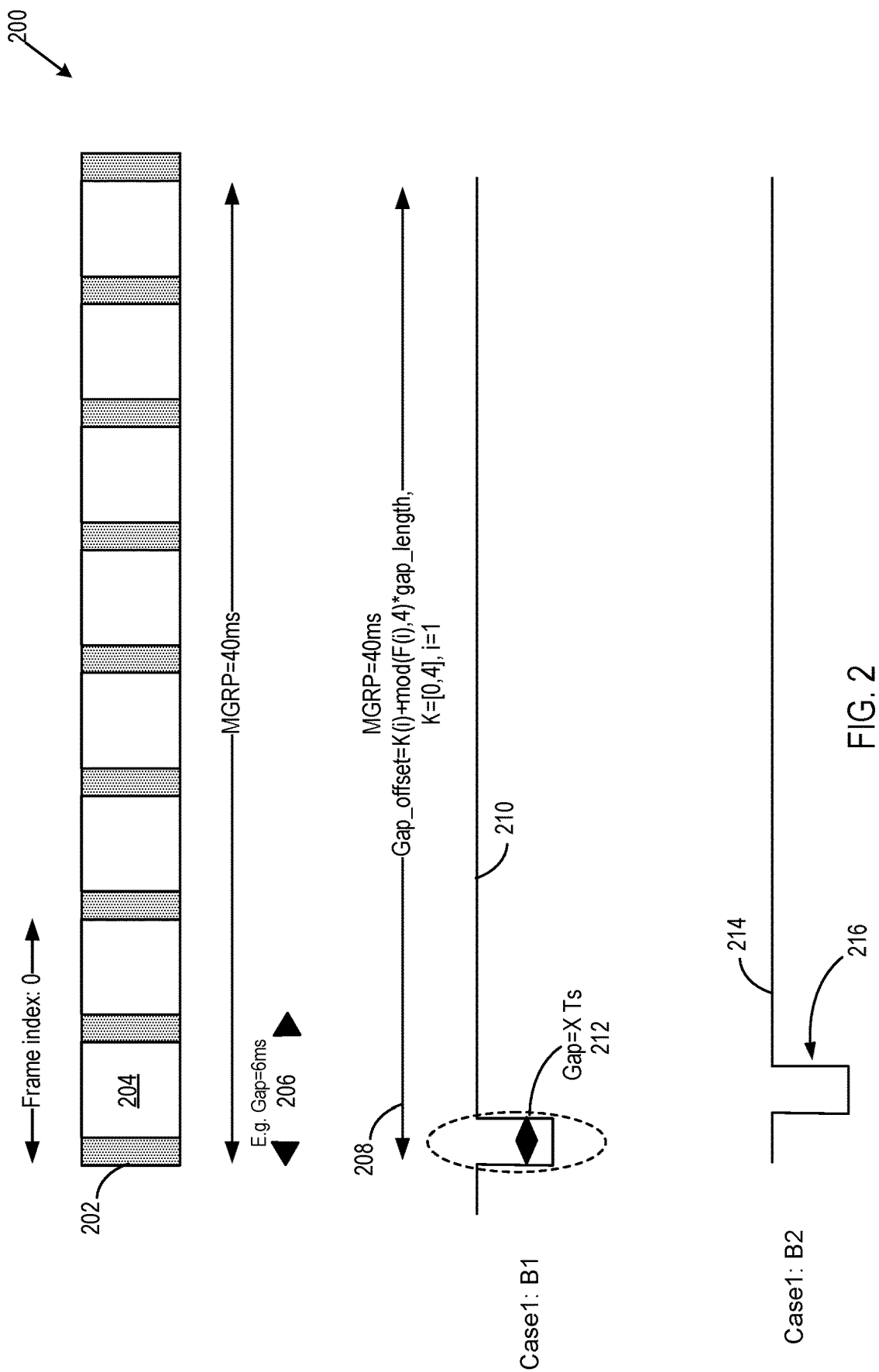
FIG. 2 is a schematic diagram illustrating a scheduled measurement gap by a gNB for one or more UEs to perform intrafrequency/interfrequency measurements consistent with embodiments disclosed herein.

FIG. 2 shows a diagram 200 of a scheduled measurement gap 212 by a gNB for one or more UEs to perform intrafrequency and/or interfrequency measurements during muted portions 202 of frames 204. In the embodiment shown, an intergap timing (or period or distance or duration) 206 is 6 ms. A measurement gap repetition period (MGRP) 208 is 40 ms. The MGRP 208 can include a gap offset which is $Gap\_offset=K(i)+mod(F(i),4)*gap\_length$, where $K=[0,4]$ and $i=1$. During a measurement gap, one or more UEs are not scheduled for transmissions and the UE can perform intrafrequency and/or interfrequency measurements of BRS. For example, a first UE B1 can be scheduled 210 for the first gap 212 and a second UE B2 can be scheduled 214 for a second measurement gap 216.

For example, in embodiment 1, a LTE network assigns the measurement pattern to different measurement objects (e.g., beams). In operation 1, a LTE eNB can configure the measurement gap pattern for a UE performing interfrequency measurements, which can be based on LTE measurement gaps. In operation 2, an eNB can schedule the specific flag to indicate the gap pattern is used for NR BRS measurement only. Alternatively, the NR carrier is added in the measurement object (e.g., information element). In operation 3, if the gap could be used for NR, gNB transmits on the BRS for specific beam during this gap. In operation 4, a UE performs the measurement on the specific beam within the measurement gap, then reports the result to eNB.

Information elements that describe the gap and/or flag the gap for NR BRS measurement include a MeasGapConfigNRnformation information element and a MeasObjectEUTRA information element. A MeasGapConfigNRnformation element can include the following:

```
MeasGapConfigNRnformation element
-- ASN1START
MeasGapConfigNR:=              CHOICE {
     NRBRSFlag                 boolean(true, false)
     }
}
-- ASN1STOP
```

A MeasObjectEUTRA information element can include the following:

```
MeasObjectEUTRA information element
-- ASN1START
MeasObjectEUTRA ::=            SEQUENCE {
     carrierFreq                    ARFCN-ValueEUTRA,
     allowedMeasBandwidth           AllowedMeasBandwidth,
     presenceAntennaPort1           PresenceAntennaPort1,
     neighCellConfig                NeighCellConfig,
     offsetFreq                     Q-OffsetRange              DEFAULT dB0,
     -- Cell list
     cellsToRemoveList              CellIndexList              OPTIONAL, --
     cellsToAddModList              CellsToAddModList          OPTIONAL, --
Need ON
     -- Black list
     blackCellsToRemoveList         CellIndexList              OPTIONAL, --
Need ON
     blackCellsToAddModList         BlackCellsToAddModList OPTIONAL, --
Need ON
     cellForWhichToReportCGI        PhysCellId                 OPTIONAL, --
Need ON
     ...,
     [[measCycleSCell-r10           MeasCycleSCell-r10         OPTIONAL, --
Need ON
     measSubframePatternConfigNeigh-r10 MeasSubframePatternConfigNeigh-r10
     OPTIONAL                       -- Need ON
     ]],
     [[widebandRSRQ-Meas-r11        BOOLEAN OPTIONAL           -- Cond WB-RSRQ
     ]],
     [[ altTTT-CellsToRemoveList-r12    CellIndexList          OPTIONAL, --
Need ON
     altTTT-CellsToAddModList-r12 AltTTT-CellsToAddModList-r12 OPTIONAL, -
     t312-r12                       CHOICE {
          release                       NULL,
          setup                         ENUMERATED {ms0, ms50, ms100, ms200,
                                        ms300, ms400, ms500, ms1000}
     }                                                         OPTIONAL, --
```

-continued

| | | |
|---|---|---|
| Need ON | | |
| reducedMeasPerformance-r12 | BOOLEAN | OPTIONAL, -- |
| Need ON | | |
| measDS-Config-r12 | MeasDS-Config-r12 | OPTIONAL -- |
| Need ON | | |
| ]], | | |
| [[ | | |
| whiteCellsToRemoveList-r13 CellIndexList | | OPTIONAL, -- |
| Need ON | | |
| whiteCellsToAddModList-r13 WhiteCellsToAddModList-r13 OPTIONAL, -- | | |
| Need ON | | |
| rmtc-Config-r13 | RMTC-Config-r13 | OPTIONAL, -- Need ON |
| carrierFreq-r13 | ARFCN-ValueEUTRA-v9e0 | OPTIONAL - |
| ]] | | |
| [[carrierFreq-NR | ARFCN-ValueNR | OPTIONAL, --Need ON |

Figure 3:
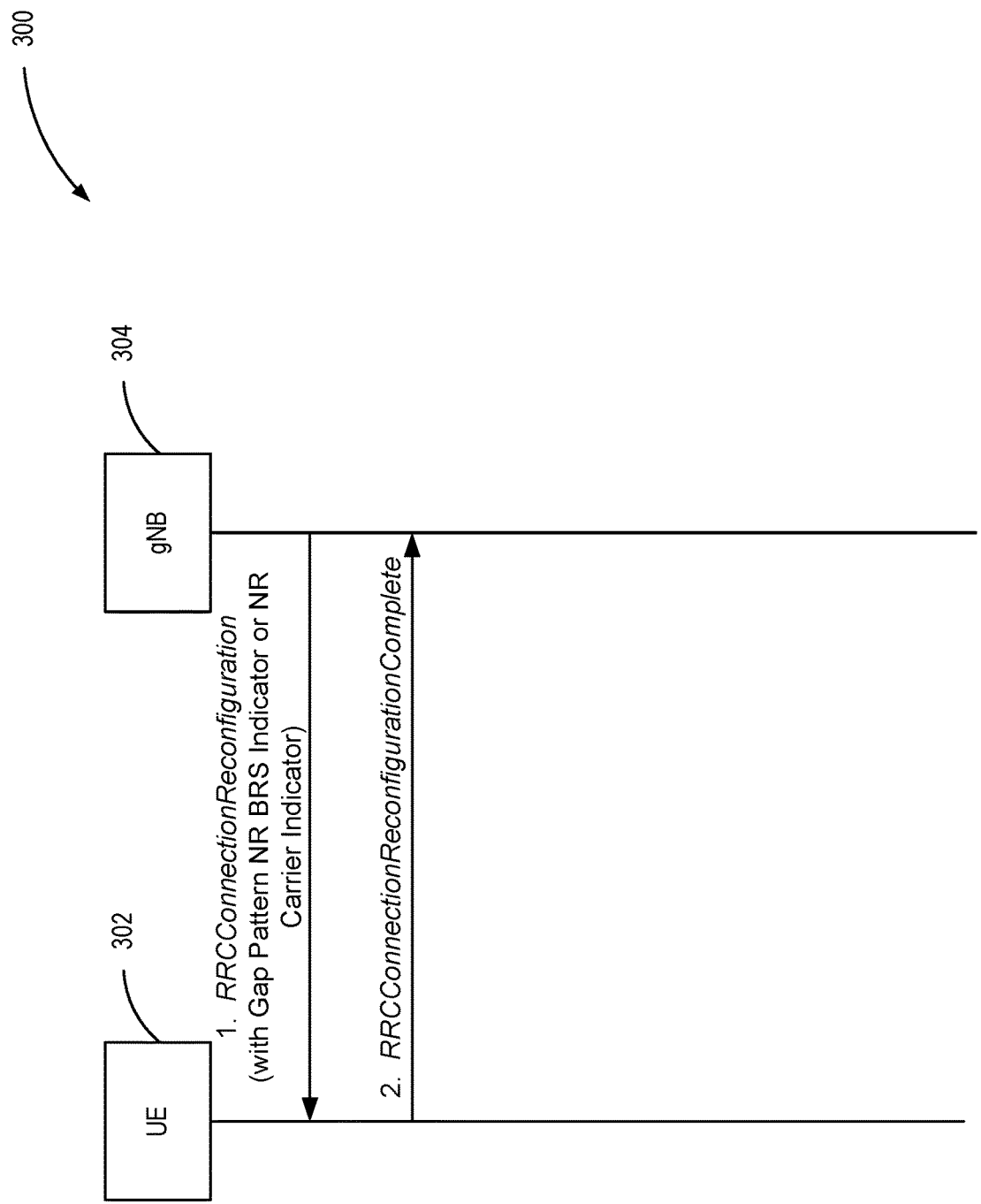
FIG. 3 is a block diagram of RRCConnectionReconfiguration message and response consistent with embodiments disclosed herein.

FIG. 3 is a block diagram of RRCConnectionReconfiguration message and response consistent with embodiments disclosed herein. In some embodiments, the information elements can be signaled directly to a UE 302 by a gNB 304. The gNB 304 can determine a gap pattern for the UE 302 use. The gNB 304 sends the UE 302 a RRCConnectionReconfiguration message that includes the gap pattern NR BRS indicator and/or a NR carrier indicator (such as with a field of an information element). The UE 302 can acknowledge the message with a RRCConnectionReconfigurationComplete message and use the gap pattern for detection and/or measurement of NR BRS.

Figure 4:
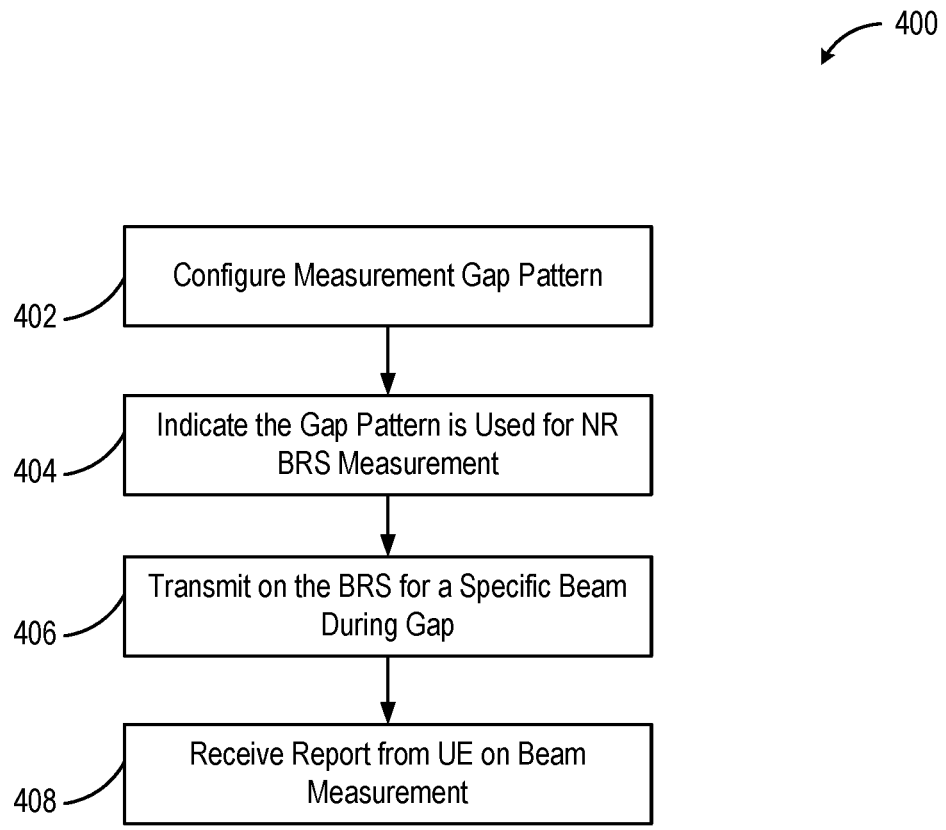
FIG. 4 is a flow chart illustrating a method for performing beam measurements in a cellular network consistent with embodiments disclosed herein.

FIG. 4 is a flow diagram 400 illustrating a method for performing beam measurements in a cellular network. The method can be performed by systems such as those shown in FIG. 5, including UE 501 and RAN 510. In block 402, a gNB configures a measurement gap pattern. In block 404, the gNB indicates the gap pattern is used for NR BRS measurement. In block 406, the gNB transmits on the BRS for a specific beam during the gap. In block 408, the gNB receives a report from the UE regarding the beam measurement(s).

Figure 5:
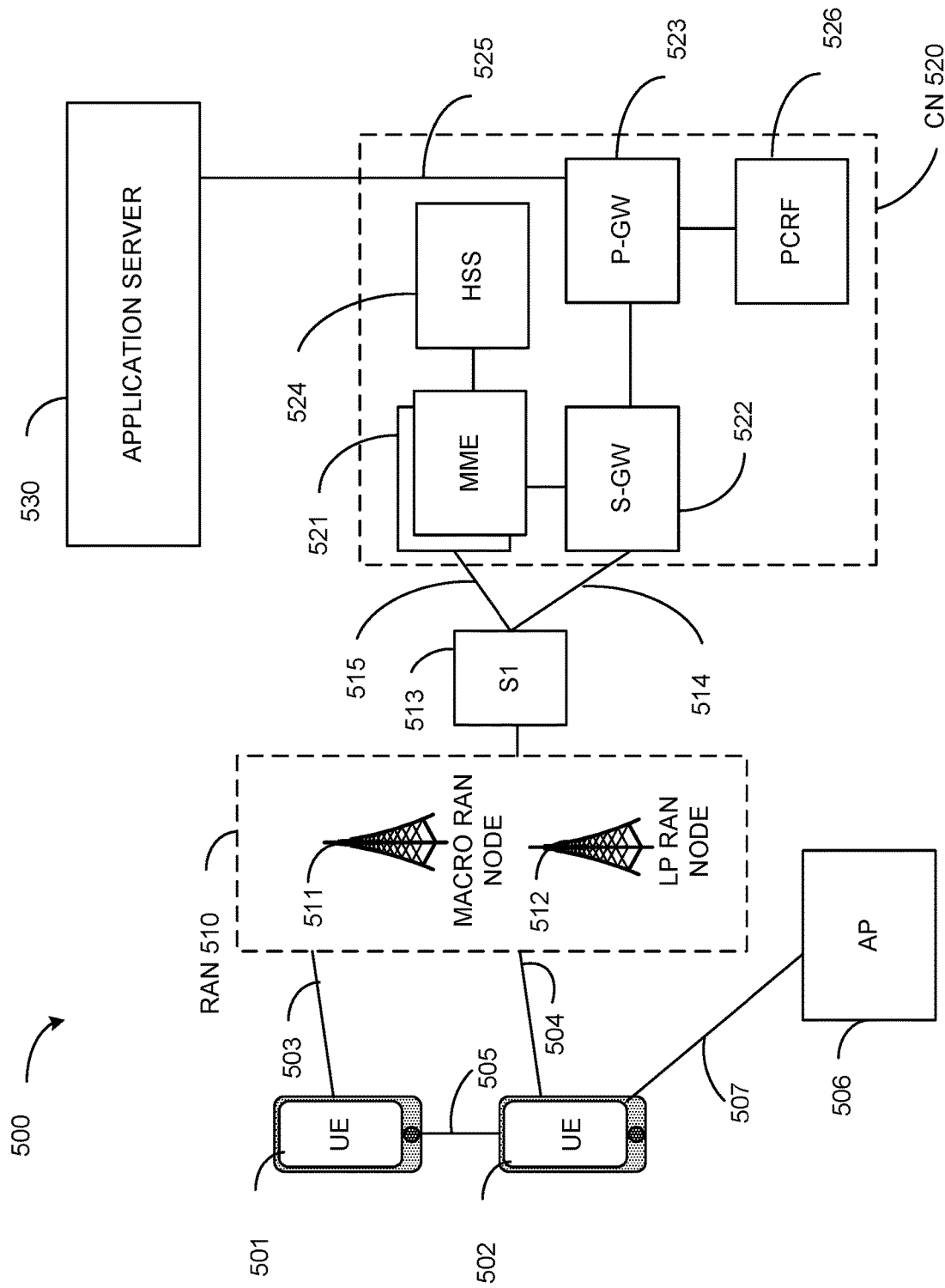
FIG. 5 is an architecture of a system of a network consistent with embodiments disclosed herein.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510. The RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including, but not limited to, a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via a connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., a macro RAN node 511, and one or more RAN nodes for providing femtocells or picocells (e.g., cells having smaller coverage areas, smaller user capacity, or higher bandwidth compared to macrocells), e.g., a low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and a serving gateway (S-GW) 522, and an S1-mobility management entity (MME) interface 515, which is a signaling interface between the RAN nodes 511 and 512 and MMEs 521.

In this embodiment, the CN 520 comprises the MMEs 521, the S-GW 522, a Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the CN 520 (e.g., an EPC network) and external networks such as a network including an application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to the application server 530 via the IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. A Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
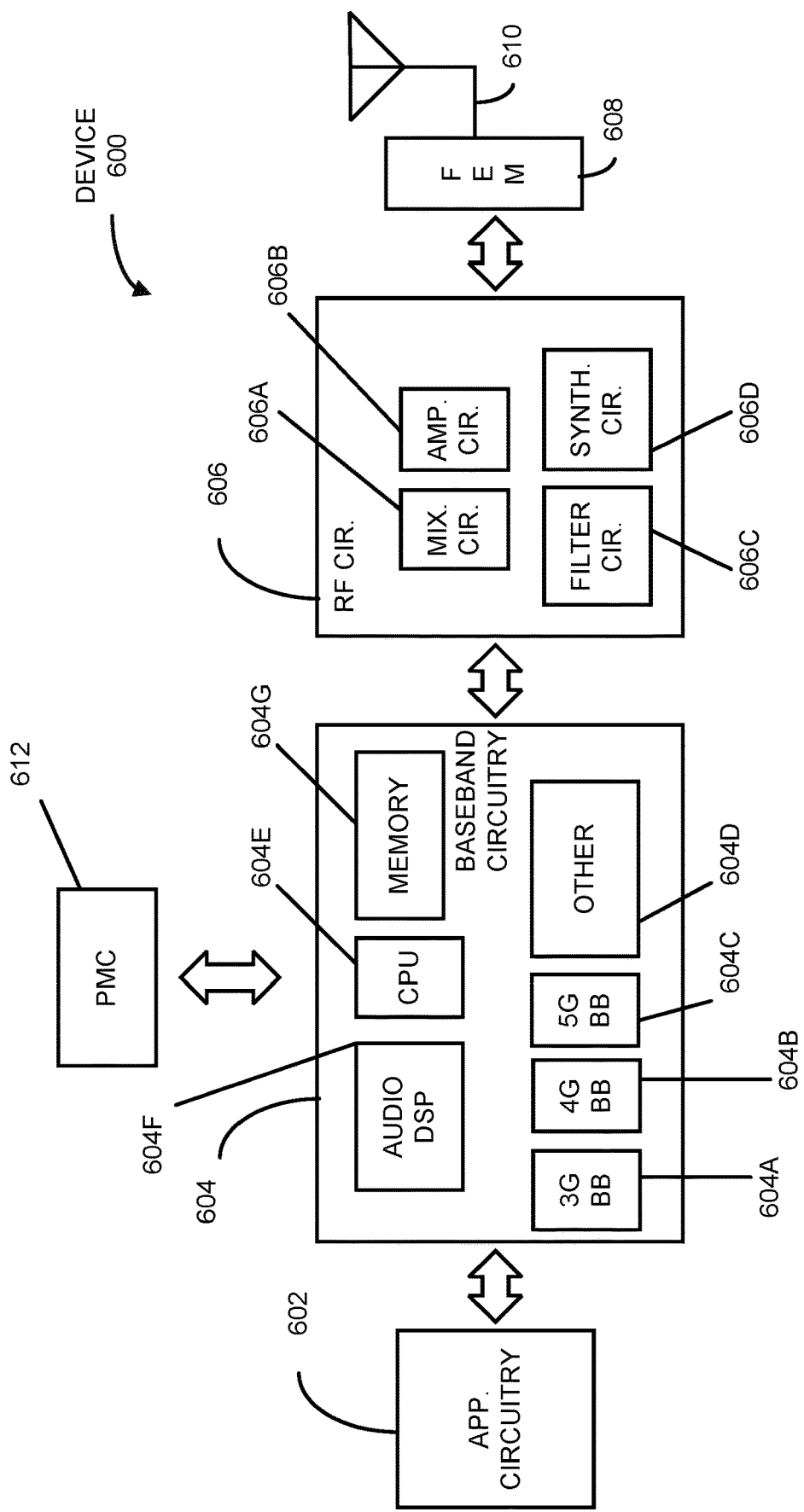
FIG. 6 is a diagram illustrating example components of a device consistent with embodiments disclosed herein.

FIG. 6 illustrates example components of a device 600 in accordance with some embodiments. In some embodiments, the device 600 may include an application circuitry 602, a baseband circuitry 604, a Radio Frequency (RF) circuitry 606, a front-end module (FEM) circuitry 608, one or more antennas 610, and a power management circuitry (PMC) 612 coupled together at least as shown. The components of the illustrated device 600 may be included in a UE or a RAN node. In some embodiments, the device 600 may include fewer elements (e.g., a RAN node may not utilize the application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of the application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. The baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of the baseband processors 604A-D) may handle various radio control functions that enable communication with one or more radio networks via the RF circuitry 606. In other embodiments, some or all of the functionality of the baseband processors 604A-D may be included in modules stored in a memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., to facilitate the communication with the wireless network. The RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606A, amplifier circuitry 606B and filter circuitry 606C. In some embodiments, the transmit signal path of the RF circuitry 606 may include filter circuitry 606C and mixer circuitry 606A. RF circuitry 606 may also include synthesizer circuitry 606D for synthesizing a frequency for use by the mixer circuitry 606A of the receive signal path and the transmit signal path. In some embodiments, the mixer circuitry 606A of the receive signal path may be configured to down-convert RF signals received from the FEM circuitry 608 based on the synthesized frequency provided by synthesizer circuitry 606D. The amplifier circuitry 606B may be configured to amplify the down-converted signals and the filter circuitry 606C may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 606A of the receive signal path may comprise passive mixers, although the scope of the embodiments is not limited in this respect.

In some embodiments, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by the filter circuitry 606C.

In some embodiments, the mixer circuitry 606A of the receive signal path and the mixer circuitry 606A of the transmit signal path may include two or more mixers and may be arranged for quadrature downconversion and upconversion, respectively. In some embodiments, the mixer circuitry 606A of the receive signal path and the mixer circuitry 606A of the transmit signal path may include two or more mixers and may be arranged for image rejection (e.g., Hartley image rejection). In some embodiments, the mixer circuitry 606A of the receive signal path and the mixer circuitry 606A of the transmit signal path may be arranged for direct downconversion and direct upconversion, respectively. In some embodiments, the mixer circuitry 606A of the receive signal path and the mixer circuitry 606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606D may be a fractional-N synthesizer or a fractional N/N+1 synthesizer, although the scope of the embodiments is not limited in this respect as other types of frequency synthesizers may be suitable. For example, synthesizer circuitry 606D may be a delta-sigma synthesizer, a frequency multiplier, or a synthesizer comprising a phase-locked loop with a frequency divider.

The synthesizer circuitry 606D may be configured to synthesize an output frequency for use by the mixer circuitry 606A of the RF circuitry 606 based on a frequency input and a divider control input. In some embodiments, the synthesizer circuitry 606D may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 606D of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. The FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by the RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device 600 is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, the application circuitry 602, the RF circuitry 606, or the FEM circuitry 608.

In some embodiments, the PMC 612 may control, or otherwise be part of, various power saving mechanisms of the device 600. For example, if the device 600 is in an RRC Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
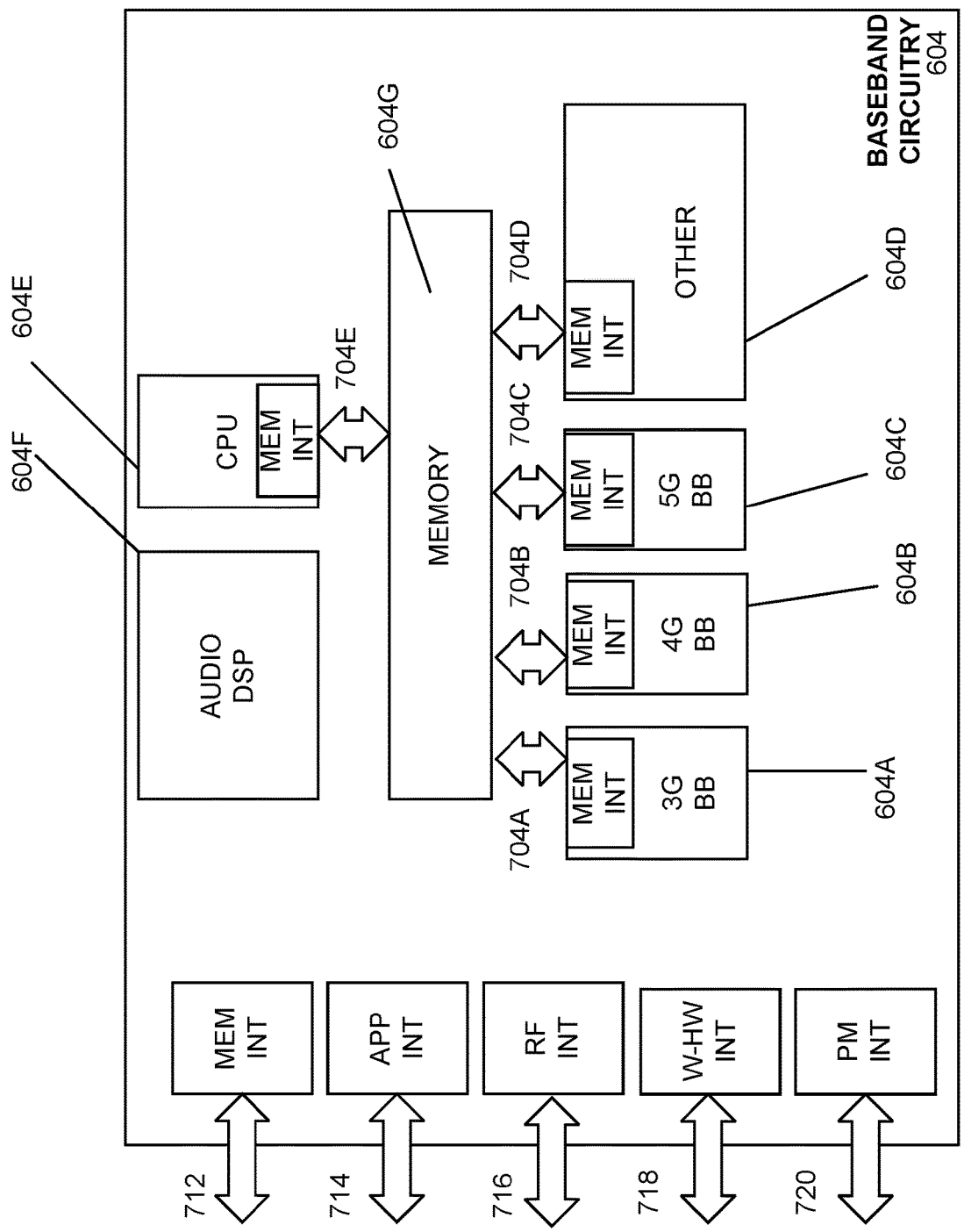
FIG. 7 is a diagram illustrating example interfaces of baseband circuitry consistent with embodiments disclosed herein.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
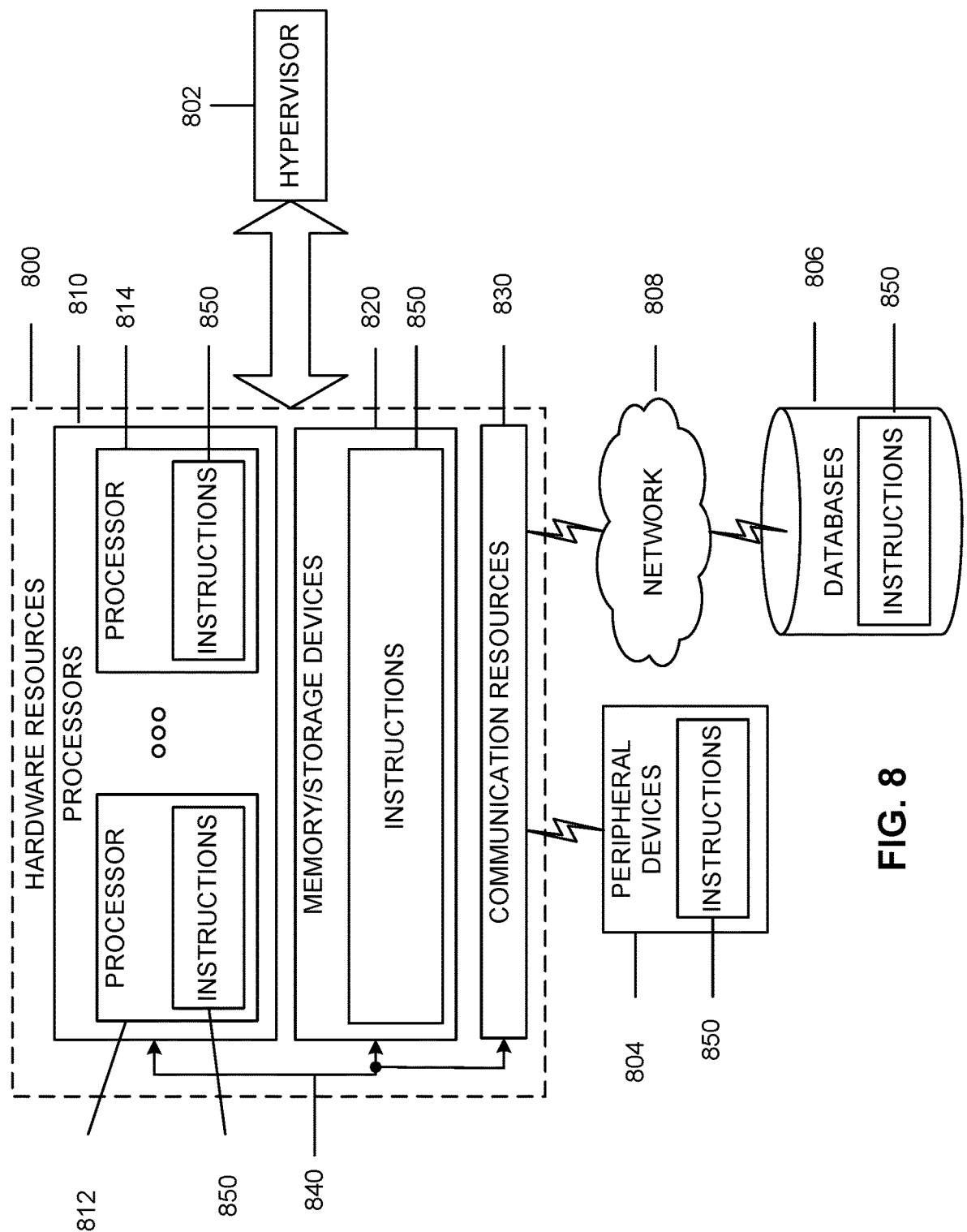
FIG. 8 is a block diagram illustrating components able to read instructions from a machine-readable or computer-readable medium consistent with embodiments disclosed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 9:
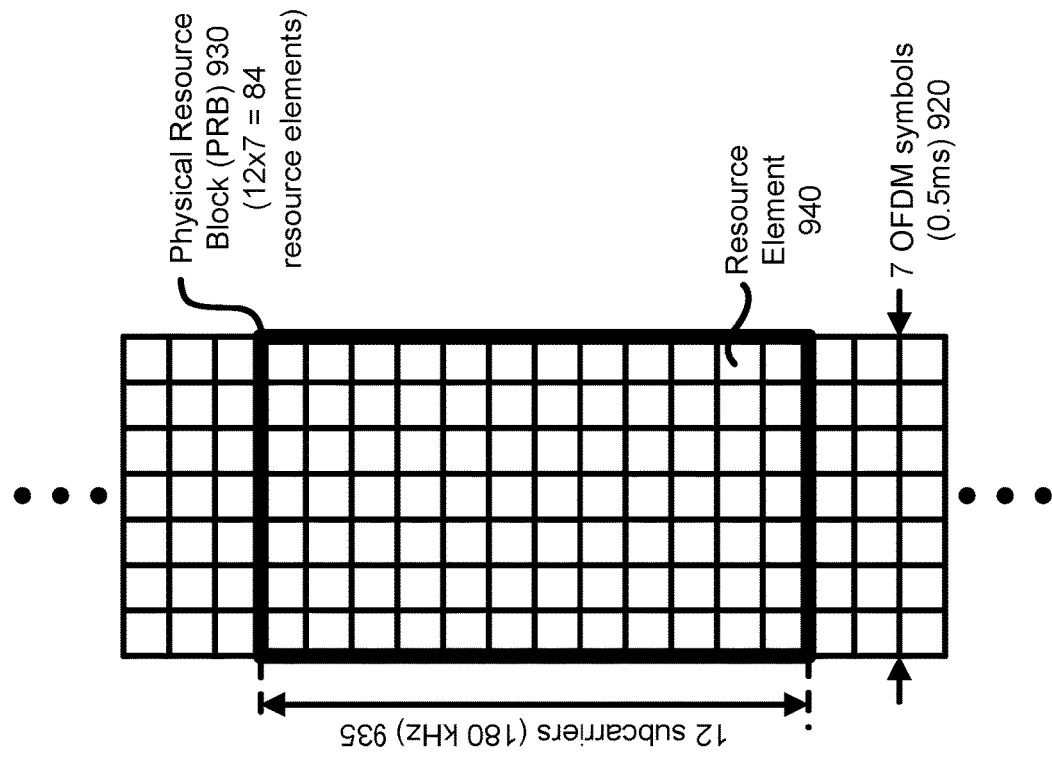
FIG. 9 is a schematic diagram illustrating the structure of a long term evolution (LTE) communication frame consistent with embodiments disclosed herein.
Figure 9:
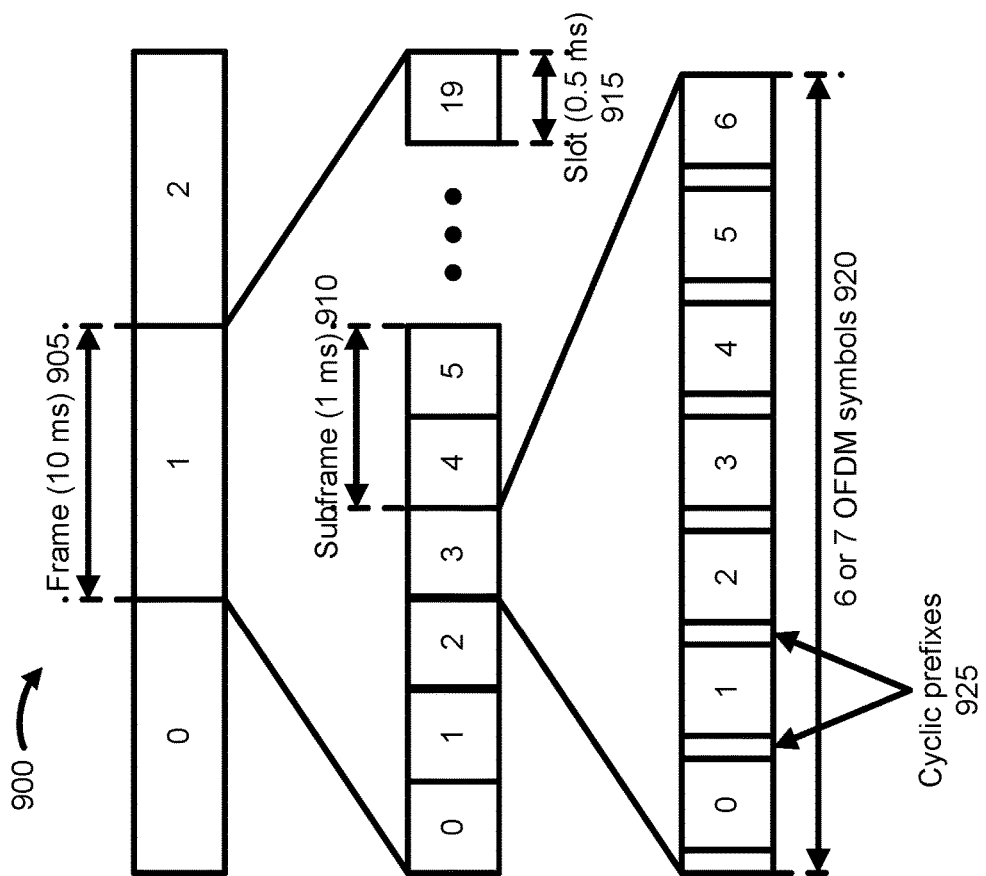

FIG. 9 is a schematic diagram 900 illustrating the structure of a long term evolution (LTE) communication frame 905. A frame 905 has a duration of 10 milliseconds (ms). The frame 905 includes ten subframes 910, each having a duration of 1 ms. Each subframe 910 includes two slots 915, each having a duration of 0.5 ms. Therefore, the frame 905 includes 20 slots 915.

Each slot 915 includes six or seven orthogonal frequency-division multiplexing (OFDM) symbols 920. The number of OFDM symbols 920 in each slot 915 is based on the size of the cyclic prefixes (CP) 925. For example, the number of OFDM symbols 920 in the slot 915 is seven while in normal mode CP and six in extended mode CP.

The smallest allocable unit for transmission is a resource block 930 (i.e., physical resource block (PRB) 930). Transmissions are scheduled by PRB 930. A PRB 930 consists of 12 consecutive subcarriers 935, or 180 kHz, for the duration of one slot 915 (0.5 ms). A resource element 940, which is the smallest defined unit, consists of one OFDM subcarrier during one OFDM symbol interval. In the case of normal mode CP, each PRB 930 consists of 12×7=84 resource elements 940. Each PRB 930 consists of 72 resource elements 940 in the case of extended mode CP.

EXAMPLES

The following examples pertain to further embodiments.

Example 1 is an apparatus of a radio access network (RAN) node for inter-frequency beam measurements. The apparatus includes a memory interface to access information about a beam measurement gap pattern for beam specific reference signal (BRS) measurement. The apparatus includes a baseband processing unit designed to design the beam measurement gap pattern for a user equipment (UE) performing inter-frequency beam measurements of a set of beams created by beamforming using BRS, and generate an information element for the UE indicating the beam measurement gap pattern and an indicator of a carrier for the inter-frequency beam measurements. The baseband processing unit is also designed to prevent scheduling the UE during a gap of the beam measurement gap pattern, and process a report from the UE providing results of the inter-frequency beam measurements.

Example 2 is the apparatus of Example 1, where the BRS are transmitted by one or more neighboring RAN nodes.

Example 3 is the apparatus of Example 1, where the inter-frequency beam measurements include a transmission beam measurement of the RAN node.

Example 4 is the apparatus of Example 1, where the inter-frequency beam measurements include a receive beam measurement of the UE.

Example 5 is the apparatus of Example 1, where the report indicates beam sweep measurements performed by the UE.

Example 6 is the apparatus of Example 1, where the inter-frequency beam measurements include inter-radio access technology (RAT) measurement.

Example 7 is the apparatus of any of Examples 1-6, where the RAN node is a fifth generation node B (gNB).

Example 8 is an apparatus of a user equipment (UE) for reporting beam specific measurements. The apparatus includes a memory interface to access data describing a beam measurement gap pattern for beam measurements. The apparatus includes a processing unit designed to decode a message including an indicator from a radio access network (RAN) node indicating a beam measurement gap pattern and an indicator of a set of beamformed beams for beam measurements during gaps of the beam measurement gap pattern. The processing unit is also designed to perform a set of beam measurements of the set of beamformed beams during the gaps of the beam measurement gap pattern as indicated by the message, and generate a report from the UE to the RAN node providing results of the beam measurements.

Example 9 is the apparatus of Example 8, where the set of beam measurements are beam specific reference signal (BRS) measurements of beamformed beams formed by the RAN node.

Example 10 is the apparatus of Example 8, where the set of beam measurements are beam specific reference signal (BRS) measurements of beamformed beams formed by other RAN nodes.

Example 11 is the apparatus of Example 8, where the set of beamformed beams are transmission beams.

Example 12 is the apparatus of Example 8, where the set of beamformed beams are receive beams.

Example 13 is the apparatus of Example 8, where the processing unit is further designed to perform a handover based at least in part on beam measurements.

Example 14 is the apparatus of Example 8, where the set of beam measurements are inter-frequency measurements.

Example 15 is a method of performing beam measurements in a cellular network. The method includes designing, by a radio access network (RAN) node, a beam measurement gap pattern for a user equipment (UE) performing inter-frequency beam measurements of a set of beams created by beamforming, and generating an information element for the UE including an indicator of the beam measurement gap pattern and an indicator of a beam for beam measurements. The method also includes avoiding scheduling the UE during a gap of the beam measurement gap pattern, and processing a report from the UE providing results of the inter-frequency beam measurements.

Example 16 is the method of Example 15, further including generating a beam specific reference signal (BRS) for measurement by the UE.

Example 17 is the method of Example 15, further including receiving a beam specific reference signal (BRS) broadcast timing of one or more RAN nodes.

Example 18 is the method of Example 15, where the indicator of the beam for beam measurements further indicates a beam specific reference signal (BRS) burst.

Example 19 is the method of Example 15, further including generating a beam specific reference signal (BRS) burst multiplexed with a BRS.

Example 20 is the method of Example 15, where the RAN node is a fifth generation node B (gNB).

Example 21 is an apparatus including a method to perform a method as exemplified in any of Examples 15-19.

Example 22 is a machine readable medium including code, when executed, to cause a machine to perform the method of any one of Examples 15-19.

Example 23 is a computer program product including a computer-readable storage medium that stores instructions for execution by a processor to perform operations of a radio access network (RAN) node for performing beam measurements in a cellular network, the operations, when executed by the processor, to perform a method. The method includes designing, by a radio access network (RAN) node, a beam measurement gap pattern for a user equipment (UE) performing inter-frequency beam measurements of a set of beams created by beamforming, and generating an information element for the UE including an indicator of the beam measurement gap pattern and an indicator of a beam for beam measurements. The method also includes avoiding scheduling the UE during a gap of the beam measurement gap pattern, and processing a report from the UE providing results of the inter-frequency beam measurements.

Example 24 is an apparatus of a radio access network (RAN) node for inter-frequency beam measurements. The apparatus includes a method for designing, by a radio access network (RAN) node, a beam measurement gap pattern for a user equipment (UE) performing inter-frequency beam measurements of a set of beams created by beamforming, and a method for generating an information element for the UE including an indicator of the beam measurement gap pattern and an indicator of a beam for beam measurements. The apparatus also includes a method for avoiding scheduling the UE during a gap of the beam measurement gap pattern, and a method for processing a report from the UE providing results of the inter-frequency beam measurements.

ADDITIONAL EXAMPLES

Additional Example 1 is a method of measurement gap configuration in NR, by which there are measurement gaps within the BRS of one specific beam could be transmitted by NR eNB.

Additional Example 2 is the method of additional example 1, wherein a UE needs to measure the specific BRS within the gap only.

Additional Example 3 is the method of additional example 1, wherein the BRS burst multiplexed with some BRS could be transmitted by NR.

Additional Example 4 is the method of additional example 2, wherein the UE needs to switch the phase shifter to the specific beam which is transmitted to within the gap.

Additional Example 5 is the method of additional example 3 wherein the UE needs to switch the phase shifter to the a burst of beams with the same multiplex method.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus of a radio access network (RAN) node for inter-frequency beam measurements comprising:
   a memory interface to access information about a beam measurement gap pattern for beam specific reference signal (BRS) measurement;
   a baseband processing unit configured to:
      configure the beam measurement gap pattern for a user equipment (UE) performing inter-frequency beam measurements of a set of beams created by beam-forming using BRS;
      generate an information element for the UE indicating the beam measurement gap pattern and an indicator of a carrier for the inter-frequency beam measurements, wherein the information element comprises a flag to indicate the beam measurement gap pattern is for the BRS measurement;
prevent scheduling the UE during a gap of the beam measurement gap pattern; and
process a report from the UE providing results of the inter-frequency beam measurements.

2. The apparatus of claim 1, wherein the BRS are transmitted by one or more neighboring RAN nodes.

3. The apparatus of claim 1, wherein the inter-frequency beam measurements include a transmission beam measurement of the RAN node.

4. The apparatus of claim 1, wherein the inter-frequency beam measurements include a receive beam measurement of the UE.

5. The apparatus of claim 1, wherein the report indicates beam sweep measurements performed by the UE.

6. The apparatus of claim 1, wherein the inter-frequency beam measurements include inter-radio access technology (RAT) measurement.

7. The apparatus of claim 1, wherein the RAN node is a fifth generation node B (gNB).

8. An apparatus of a user equipment (UE) for reporting beam specific measurements comprising:
a memory interface to access data describing a beam measurement gap pattern for beam measurements;
a processing unit configured to:
decode a message comprising an indicator from a radio access network (RAN) node indicating the beam measurement gap pattern and an indicator of a set of beamformed beams for beam measurements during gaps of the beam measurement gap pattern, wherein the message comprises a flag to indicate the beam measurement gap pattern is for beam specific reference signal (BRS) measurement;
perform a set of beam measurements of the set of beamformed beams during the gaps of the beam measurement gap pattern as indicated by the message; and
generate a report from the UE to the RAN node providing results of the beam measurements.

9. The apparatus of claim 8, wherein the set of beam measurements are beam specific reference signal (BRS) measurements of beamformed beams formed by the RAN node.

10. The apparatus of claim 8, wherein the set of beam measurements are beam specific reference signal (BRS) measurements of beamformed beams formed by other RAN nodes.

11. The apparatus of claim 8, wherein the set of beamformed beams are transmission beams.

12. The apparatus of claim 8, wherein the set of beamformed beams are receive beams.

13. The apparatus of claim 8, wherein the processing unit is further configured to perform a handover based at least in part on beam measurements.

14. The apparatus of claim 8, wherein the set of beam measurements are inter-frequency measurements.

15. A non-transitory computer program product comprising a computer-readable storage medium that stores instructions for execution by a processor to perform operations of a radio access network (RAN) node for performing beam measurements in a cellular network, the operations, when executed by the processor, to perform a method, the method comprising:
configuring a beam measurement gap pattern for a user equipment (UE) performing inter-frequency beam measurements of a set of beams created by beamforming;
generating an information element for the UE comprising an indicator of the beam measurement gap pattern and an indicator of a beam for beam measurements, wherein the information element comprises a flag to indicate the beam measurement gap pattern is for beam specific reference signal (BRS) measurement;
avoiding scheduling the UE during a gap of the beam measurement gap pattern; and
processing a report from the UE providing results of the inter-frequency beam measurements.

16. The non-transitory computer program product of claim 15, wherein the method further comprises generating a beam specific reference signal (BRS) for measurement by the UE.

17. The non-transitory computer program product of claim 15, wherein the method further comprises receiving a beam specific reference signal (BRS) broadcast timing of one or more RAN nodes.

18. The non-transitory computer program product of claim 15, wherein the indicator of the beam for beam measurements further indicates a beam specific reference signal (BRS) burst.

19. The non-transitory computer program product of claim 15, wherein the method further comprising generating a beam specific reference signal (BRS) burst multiplexed with a BRS.

20. The non-transitory computer program product of claim 15, wherein the RAN node is a fifth generation node B (gNB).

* * * * *